United States Patent [19]
Bradbury et al.

[11] Patent Number: 5,397,476
[45] Date of Patent: Mar. 14, 1995

[54] PURIFICATION OF SOLUTIONS

[75] Inventors: David Bradbury; Philip M. Tucker, both of Wotton-Under-Edge; George R. Elder, Westbury-on-Severn, all of United Kingdom

[73] Assignee: Bradtec Limited, Bristol, United Kingdom

[21] Appl. No.: 909,848

[22] Filed: Jul. 7, 1992

[30] Foreign Application Priority Data

Jul. 11, 1991 [GB] United Kingdom ............... 9115018

[51] Int. Cl.$^6$ ................... B01D 15/08; C02F 1/28
[52] U.S. Cl. ................... 210/675; 210/679; 210/682; 210/688; 210/695
[58] Field of Search ............... 210/670, 679, 688, 695, 210/676, 682, 675

[56] References Cited

U.S. PATENT DOCUMENTS

| 2,642,514 | 6/1953 | Herkenhoff | 210/695 |
| 3,560,378 | 2/1971 | Weiss et al. | 210/679 |
| 4,285,819 | 8/1981 | Yen et al. | 210/695 |
| 4,994,191 | 2/1991 | Kuznicki et al. | 210/688 |

FOREIGN PATENT DOCUMENTS

| 668584 | 2/1966 | Belgium . |
| 0111999 | 6/1984 | European Pat. Off. . |
| 0217143 | 4/1987 | European Pat. Off. . |
| 0302293 | 2/1989 | European Pat. Off. . |
| 2376873 | 8/1978 | France . |

OTHER PUBLICATIONS

Derwent Abstract 88-244769 (JP-A-63175686).
Derwent Abstract 90-337741 (JP-A-22 41548).
Patent Abstracts of Japan, vol. 41, No. 66 (JP-55016510).

*Primary Examiner*—Ivars Cintins
*Attorney, Agent, or Firm*—Watson, Cole, Grindle & Watson

[57] ABSTRACT

A method for the removal of pollutant ions from an aqueous solution in which they are contained, which method includes the steps of:

i) contacting the solution to be treated with particles of a composite magnetic resin which includes magnetic particles embedded in an organic polymeric matrix which either contains, or has attached thereto sites which are selective for the pollutant ions in the presence of other ions it is not desired to remove;

ii) separating by magnetic filtration the composite magnetic resin particles from the solution;

iii) subjecting the separated composite magnetic resin particles to regeneration using an appropriate regenerant solution;

iv) separating the regenerated composite magnetic resin particles from the regenerant solution; and v) recycling the separated composite magnetic resin particles to step (i) of the method.

7 Claims, 1 Drawing Sheet

PURIFICATION OF SOLUTIONS

BACKGROUND OF THE INVENTION

The present invention relates to a method for the purification of solutions, in particular aqueous solutions, in order to remove pollutant ions, such as heavy metals and radio-nuclides therefrom.

The purification of water to remove heavy metals and radionuclides is one of the primary tasks required for environmental clean-up. In many cases the water contains quantities of other solid or liquid materials which it would be uneconomic to recover together with the contaminants, and it is therefore desirable to be able to remove selectively the toxic materials in question. Most commonly in water treatment an undesirable constituent is removed by absorbing it onto, or converting it into, a solid phase. If this is done the material can be removed by physical settling or "column" operation, if the particles are large, or filtration, if the particles are small.

In order to treat large flow rates of water in small sized plants it is necessary for the transfer of pollutant to a solid phase to take place rapidly, which infers that small particles will be desirable. Also, if the particles are non-porous they will need to be small to achieve an adequate surface to volume ratio, thereby achieving a reasonable capacity for the pollutant in question. However, the filtration of small particles is normally difficult and energy intensive.

Selective ion exchange is well established as a technique for removing selected pollutants from water, in particular chelating ion exchange, in which the metals are held by organic chelating groups attached to a solid organic polymer. The binding reaction is typically reversed by exposure to acid solutions.

It has been previously proposed to remove solid or liquid phases from liquid media by processes which involve a magnetic treatment.

For example, GB-A-2170736 describes the functionalisation of magnetite with sulphide groupings that attract heavy metals.

GB-A-2206206 describes a method of binding small particles reversibly to magnetic particles using a polyionic polymer to effect the binding, for the purposes of removing the small particles from solution. This method is particularly applicable to the clarification of solutions.

EP-A-0302293 describes the purification of solids and liquids by means of a granulate of magnetic particles mixed with a substance which absorbs the impurities to be removed. The granulate is produced by mixing the magnetic particles with the absorber and pressing the mixture.

U.S. Pat. No. 4,935,147 describes the separation of a substance from a liquid medium in which magnetic particles are coupled to non-magnetic particles by chemical means for non-specifically binding the particles together. The chemical means for binding the particles together may be, for example, a polyelectrolyte. The binding is reversible.

U.S. Pat. No. 4,134,831 describes a process for removing pollutants from lakes, rivers or ocean sediments in which a selective ion exchanges is mechanically attached to magnetic particles, for example by mixing the ion exchanger with the magnetic material and forming granules therefrom.

U.S. Pat. No. 4,661,327 describes a process for the removal of contaminants from soil by mixing the soil with a cation or anion resin polymerised on a magnetic core, followed by magnetic separation of the magnetic particles.

SUMMARY OF THE INVENTION

We have now developed a method for the removal of metal ions from a solution in which they are contained which uses selective particulate resins in an absorption/regeneration cycle in which magnetic filtration is used twice, first to recover particles from the solution to be treated, and secondly to recover the particles from the regenerant solution for recycle.

Accordingly, the present invention provides a method for the removal of one or more pollutant ions from an aqueous solution in which they are contained, which method comprises the steps of:

i) contacting the solution to be treated with particles of a composite magnetic resin which comprises magnetic particles embedded in an organic polymeric matrix which either contains, or has attached thereto, sites which are selective for the pollutant ions in the presence of other ions it is not desired to remove;

ii) separating by magnetic filtration the composite magnetic resin particles from the solution;

iii) subjecting the separated composite magnetic resin particles to regeneration using an appropriate regenerant solution;

iv) separating the regenerated composite magnetic resin particles from the regenerant solution; and v) recycling the separated composite magnetic resin particles to step (i) of the method.

The pollutant ions which are removed by the method of the present invention may comprise metal ions or other pollutant ions.

The particles used in the method of the present invention comprise a composite in which magnetic particles are embedded in an organic polymeric matrix which either contains, or has attached thereto, sites which are selective for the pollutant ions which are to be removed. It will be understood that all references throughout the specification to a "polymeric matrix" refer to an organic polymeric matrix.

The method of the present invention removes ionic contamination selectively from solution in such a way that ionic components which it is not desired to remove are not removed by the magnetic particles. Furthermore, the method of the present invention employs durable magnetic particles which do not involve the mechanical attachment of selective ion exchangers to the magnetic particles. The durability of the particles used in the present invention is important because the particles must be able to withstand the agitation and attrition forces generated during the various steps of the method. If the magnetic particles became detached from the selective ion exchanger during the absorption phase in the method of the invention, the ion exchanger with its captured contamination would fail to be removed by the magnetic filter and the solution would then contain the contamination in highly concentrated form on the exchanger. It is therefore essential that the particles used in the method of the present invention are durable and that the magnetic function does not become separated from the selective ion exchange function during use.

The composite may thus comprise magnetic particles embedded in polymeric resin which contains active sites and as is well known in the art polymeric resins may be engineered to contain specific functional groups which are specifically intended to absorb selectively a particular pollutant ion, or a particular group of pollutant ions, such as metal ions, in the presence of other ions it is not desired to remove. For example, the polymeric resin may contain amidoxime groupings which selectively absorb heavy metals in the presence of alkali and alkaline earth metals, or phenol formaldehyde methylene sulphonic acid groupings for the removal of caesium, or quaternary ammonium groups for the removal of other pollutant anions.

Alternatively, the composite may comprise magnetic particles embedded in a polymeric resin which has small particles of selective absorbers bound thereto. The selective absorbers may be, for example, potassium cobalt hexacyanoferrate, manganese dioxide, hydrated oxides of titanium or aluminosilicates.

The base polymer which is used in either of the alternative approaches discussed above may be any polymer, for example a polyester or a cross-linked polyester/styrene co-polymer with a high proportion of active —OH groupings on the polymer backbone for conversion to the required functional groups, or may be specially formulated polymers which already contain the required functionality, for example, polyacrylamides.

The composite magnetic resin particles used in the present invention will generally have a relatively small overall diameter, preferably less than 20 micrometers, more preferably less than 10 micrometers, to ensure that the surface-to-volume ratio is high, thereby maximising the availability of active sites for contamination removal.

The magnetic material which is embedded within the composite magnetic resin particles used in the present invention may be any material with magnetic properties which can be formed into a composite with the polymer, for example magnetite may conveniently be used.

In carrying out the method of the present invention the composite magnetic resin particles are contacted with the solution to be treated. When the solution to be treated is an aqueous solution the composite magnetic resin particles may be contacted with a flowing stream of the solution. The composite magnetic resin particles are mixed with the solution and selectively absorb the pollutant ion(s) therefrom.

The composite magnetic resin particles, polluted with the pollutant ion(s), are then selectively removed from the solution by magnetic filtration using techniques which are known in the art. The composite magnetic resin particles are then recovered from the filter and the pollutant ion(s) removed therefrom using an appropriate regenerant solution, for example an acidic solution. The cleaned composite magnetic resin particles can then be recovered from the regenerant solution by magnetic filtration and the clean particles recycled to the first step of the method.

The present invention will be further described with reference to the accompanying drawings.

DETAILED DESCRIPTION OF THE PREFERRED EMBODIMENT

Figure 1:
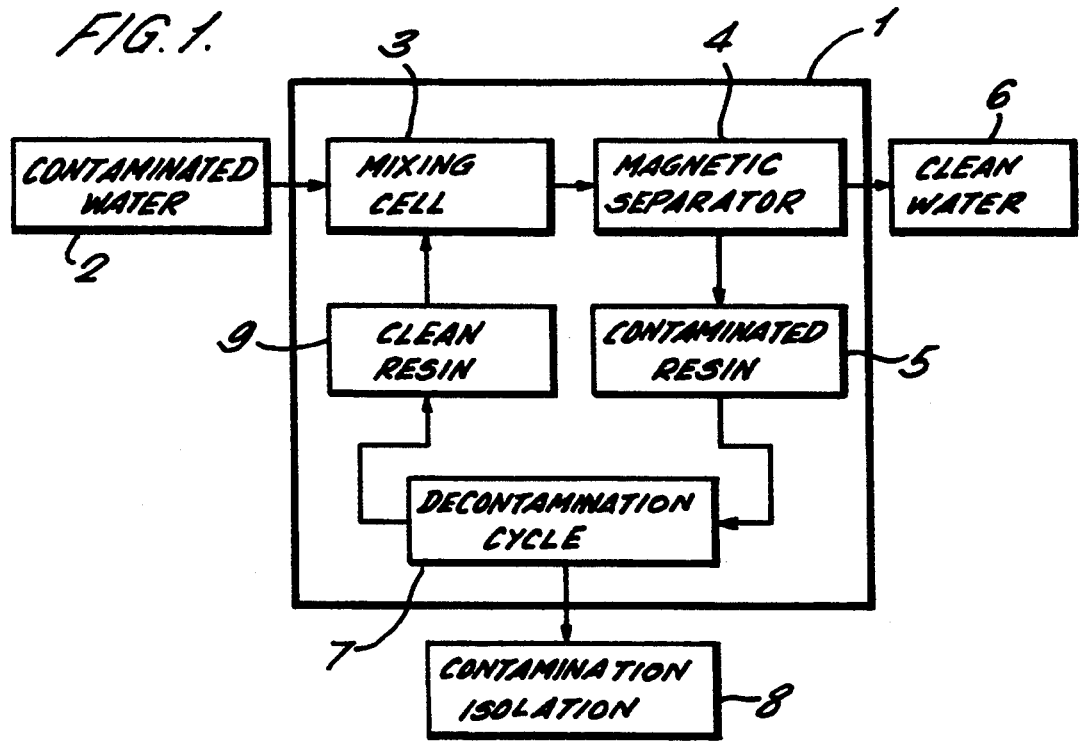
FIG. 1 is a schematic illustration of the method of the invention.

Referring to FIG. 1, a water purification unit is shown generally at 1. Decontaminated water 2 enters a mixing cell 3 where it is mixed with an appropriate amount of composite magnetic resin particles which are chosen so as to remove the unwanted pollutant ion or ions from the contaminated water. The treated water then enters a magnetic separator 4. The contaminated resin particles 5 are separated from the clean water 6 which exits from the water decontamination unit 1. The contaminated resin particles 5 are then passed to an appropriate chamber where decontamination takes place at 7. The cleaned resin particles are separated from the contaminated regenerant by means of a magnetic separator, the contaminated solution being passed to an isolation unit 8, whilst the clean resin 9 is returned to the mixing cell 3 for further use.

Figure 2:
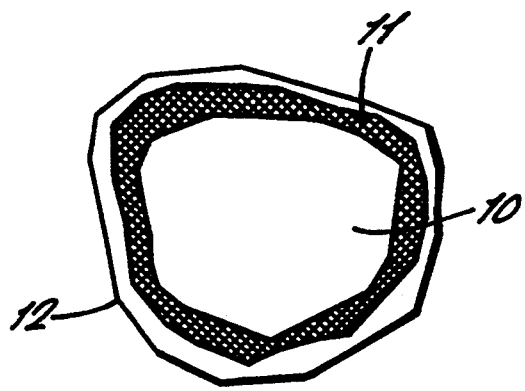
FIG. 2 is a schematic representation of the first type of composite magnetic resin particle used in the invention.

FIG. 2 illustrates a first type of complex magnetic polymer resin for use in the invention. As shown schematically in this diagram the central core 10 of the particle comprises magnetite or similar magnetic material. The magnetite is surrounded by a polymer 11 which has appropriate surface active sites (12) which contain functional groups which are specifically intended to absorb a particular pollutant ion.

Figure 3:
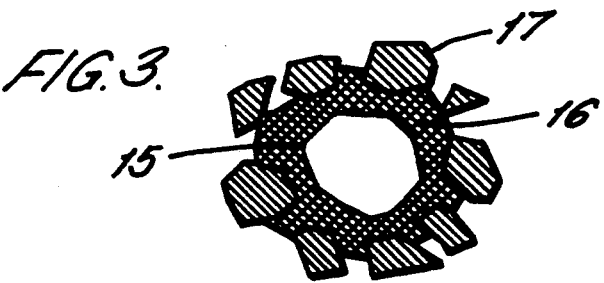
FIG. 3 is a schematic representation of the second type of composite magnetic resin particles used in the invention.

Referring to FIG. 3, the second type of composite magnetic resin particles envisaged for use in the invention is illustrated schematically. The central core of this particle 15 comprises magnetite. The magnetite is surrounded by a polymer layer 16 which has particles of a selective absorber 17 embedded in the surface thereof.

The present invention will be further described with reference to the following Examples. The superior durability of the polymeric particles used in the present invention is demonstrated in Example 3, in which an ion exchanger (clintoptilolite) was combined with magnetite by pressing, or alternatively by embedding in a polymeric matrix according to the present invention. The relative breakdown of the two types of particles on agitation demonstrates that the polymeric matrix used in the present invention is superior.

EXAMPLE 1

Copper removal using amidoxime functionalised magnetic polyacrylamide resin

A polymer comprising amidoxime functional groupings surrounding magnetite particles was prepared as follows.

10 g of magnetite were mixed with 8.7 g of acrylamide and 0.77 g of N,N'-methylene bis acrylamide, combined with 11.5 ml of water and 0.125 ml of tetramethylene diamine and catalytic quantities of ammonium persulphate. After polymerisation the resin was crushed, ground, and washed in distilled water and 0.5M HCl.

It was then equilibrated overnight in hydroxylamine at a temperature of below 5° C. to convert the —CO—$NH_2$ groups to the amidoxime function. The functionalised resin was finally conditioned by washing in distilled water, then 0.5M HCl, and cleaned in distilled water.

25 ml of this resin were transferred to a beaker, and the excess water was removed by decanting from the magnetically retained resin. 12.5 ml of water were added. Assuming a bed volume of 2.5 ml of water, the total water volume was 15 ml. 1.5 ml of 1M $CuSO_4$ solution (94.5 mg Cu) were added and the solution stirred for a few minutes. The mixture was then magnetically filtered. The resin was retained by a magnet while the liquid was removed. The copper concentration was determined by Atomic Absorption Spectroscopy. The resin was then washed, filtered magnetically, and then regenerated by eluting the chelated copper using 1M HCl. The regenerated resin was then magnetically filtered and the copper recovery determined by Atomic Absorption Spectroscopy. In this experiment 62.2 mgs of copper were retained by 25 ml of wet resin, and in the regeneration cycle 6.2 mgs of copper were recovered.

EXAMPLE 2

Caesium selective magnetic composites were made by two steps. Firstly magnetic core material was made and then the caesium selective ion exchange material was bound to the core.

Step 1—Production of Magnetic Core Material 60.82 g of finely ground, precipitated $Fe_3O_4$ were combined with 52.5 g of acrylamide, 4.64 g of N,N' methylene-bis-acrylamide and 0.5 ml of N,N'N,N' tetramethylethylenediamine in 70 mls of water. After stirring for several minutes, 0.5 ml of 5% ammonium persulphate were added and the solution stirred continuously to maintain the iron oxide in suspension until the polymerisation commenced. After several minutes the temperature rose to 100° C. and the reaction vessel was then cooled in an ice bath.

After cooling the solid resin was crushed, ground, washed and graded by sieving through meshes of progressively finer size (150 micrometers down). Finally the graded samples were washed in distilled water and filtered by magnetic filtration thereby retaining only magnetic material.

Step 2—Production of Caesium Selective Magnetic Composite 19.26 g of acrylamide, 1.7 g of N,N' methylene-bisacrylamide and 0.5 ml of N,N'N,N' tetramethylethylenediamine were dissolved in 29 mls of water. After dissolution, 15 g of magnetic core material produced in the first step and 20.0 g of powdered clinoptilolite (a naturally occurring caesium selective ion exchange mineral, less than 75 micrometers particle size) ("precursor") were added, and stirring was continued for several minutes under nitrogen, and then 2 ml of 0.25% ammonium persulphate were added and the solution stirred continuously to maintain the suspension until the polymerisation commenced. After a minute the temperature increased to 70° C. as the polymerisation progressed and the liquid began to solidify. Ice was added to cool the resin and the reaction vessel was also cooled in an ice bath.

After cooling the composite material was gently crushed, ground and graded. Washing in water and magnetic filtration was employed to separate the small quantity of precursor from the magnetic composite (less than 0.5%).

A similar procedure was followed to create another composite based on the precursor "Zeolon 900" (manufactured by Norton).

Under a low power microscope the composite structure could be observed. No noticeable loss of precursor was observed from the composite during the absorption/regeneration tests.

The absorption properties of the resin composite were tested by introducing the composite to a solution of caesium ions in the presence of sodium ions (100 mg Cs+/liter as caesium sulphate in 200 ppm solution hydroxide spiked with radioactive $Cs^{137}$ tracer). Concentrations of caesium in solution as a function of time were measured using gamma spectrometry to monitor the concentration of caesium in samples withdrawn from the solution.

10 mls of "wet" resin (equivalent to 1.7 g of dry resin) were mixed with 100 mls of the solution, and vigorously agitated.

The absorption of caesium by the caesium selective magnetic resin composite is shown in Table 1:

TABLE 1

| Time (mins) | Caesium Remaining in Solution (% initial value) | |
|---|---|---|
| | Clinoptilolite | Zeolon 900 |
| 3 | 21.5 | 10.1 |
| 10 | 5.9 | 5.6 |
| 60 | 2.0 | 1.7 |
| 960 | 0.9 | 0.8 |

After washing and magnetic filtration, the caesium loaded particles were regenerated. The regeneration properties of the resin composite were tested by introducting the composite to 250 mls of a solution of ammonium carbonate (2 mole/$dm^3$) in ammonium hydroxide (2 mole/$dm^3$). Concentrations of caesium in solution as a function of time were measured using gamma spectrometry to monitor the concentration of caesium in samples withdrawn from the solution.

The elution of caesium from the caesium selective magnetic resin composite is shown in Table 2 (note that since batch equilibration was employed, it is likely that more caesium could be removed by equilibration with fresh solution):

TABLE 2

| Time (mins) | Caesium Eluted (% initial value) | |
|---|---|---|
| | Clinoptilolite | Zeolon 900 |
| 2.5 | 49.3 | 68.7 |
| 10 | 73.5 | 87.1 |
| 30 | 84.1 | 91.5 |
| 60 | 88.0 | 92.5 |

EXAMPLE 3

This example demonstrates the superior durability of materials as described in Example 2, compared with materials made by combining the same caesium selective ion exchanger directly with the same magnetic particles under static pressure. This is particularly the case where materials are required to be exposed to water for long periods.

A sample of "pressed" material was made by the following procedure:—Magnetite (10 g), as used in Example 2, was blended with clinoptilolite (10 g), as used in Example 2 and a sample of the combined mixture was placed in a static press where it was subjected to 13 tonnes per square centimeter pressure. The resultant pellet was crushed and graded to produce a material finer than 300 micrometers. Washing in water and magnetic filtration was employed to separate the small quantity of precursor from the composite material. The washing was repeated until the supernatant liquid was clear.

This material ("pressed") and a sample of the material produced in Example 2 ("polymeric") were subjected to identical conditions of agitation in water. It was noted that the supernatant liquid became cloudy above the pressed material, becoming more turbid with time, but that above the polymeric material the supernatant liquid remained clear. After magnetic filtration to remove the magnetic material the remaining liquid was filtered and the filter cake dried and weighed. The weights of solids filtered were as follows:

| | |
|---|---|
| pressed material | 41.2 mg, approx 2% of the total material used |
| polymeric material | 0.0 mg |

The samples of the pressed and polymeric material were then stored in water for 16 hours. The process of vigorous stirring and magnetic filtration was then repeated with both materials and the supernatant liquid was once again filtered and the filter cake dried and weighed. The weights of solids filtered were as follows:

| | |
|---|---|
| pressed material | 77.0 mg, |
| polymeric material | 0.0 mg |

We claim:

1. A method for the selective removal of pollutant ions from an aqueous solution containing said pollutant ions and other ions which are not to be removed, which method comprises the steps of:

i) contacting the solution to be treated with particles of a composite magnetic resin which comprises magnetic particles embedded in an organic polymeric matrix and particles of a selective absorber material attached to said matrix which are selective for the pollutant ions in the presence of said other ions;

ii) separating by magnetic filtration the composite magnetic resin particles from the solution;

iii) subjecting the separated composite magnetic resin particles to regeneration using a regenerant solution;

iv) separating the regenerated composite magnetic resin particles from the regenerant solution; and v) recycling the separated composite magnetic resin particles to step (i).

2. Method according to claim 1 wherein the selective absorber material is selected from the group consisting of potassium cobalt hexacyanoferrate, manganese dioxide, hydrated oxides of titanium and aluminosilicates.

3. Method according to claim 1 wherein the composite magnetic resin particles have an overall diameter of less than 20 micrometers.

4. Method according to claim 3, wherein said overall diameter is less than 10 micrometers.

5. Method according to claim 1 wherein the composite resin particles are contacted with a flowing stream of the solution to be treated.

6. Method according to claim 1 wherein the composite magnetic material which have selectively absorbed the pollutant ion(s) are regenerated by contacting them with an acidic regenerant solution.

7. Method according to claim 1 wherein the pollutant ions are metal ions.

* * * * *